United States Patent Office 3,730,938
Patented May 1, 1973

3,730,938
MOISTURE-THICKENED SILICONE COMPOUNDS
Alfred H. Smith, Jr., Jonesville, and Robert A. Murphy, Burnt Hills, N.Y., assignors to General Electric Company
No Drawing. Continuation-in-part of abandoned application Ser. No. 868,887, Oct. 23, 1969. This application May 17, 1971, Ser. No. 144,222
Int. Cl. C08g 51/04
U.S. Cl. 260—37 SB
8 Claims

ABSTRACT OF THE DISCLOSURE

Organopolysiloxane compositions containing calcium carbonate in amounts of from 5 to 200 parts for each 100 parts of the organopolysiloxane are rendered thixotropic through the addition of water and/or a humectant. Removal of this water and/or humectant will return the composition to its lower viscosity state. The thixotropic organopolysiloxane composition is useful in room temperature vulcanizing compositions, in paint formulations and in grease compositions.

BACKGROUND OF THE INVENTION

This application is a continuation-in-part of parent application Ser. No. 868,887 filed Oct. 23, 1969, now abandoned. The prior art is replete with organopolysiloxanes for a variety of uses. Organopolysiloxane compositions have been disclosed as greases, room temperature vulcanizing elastomeric materials, and as portions of paint and other coating materials, for example. In each case, the viscosity of the organopolysiloxane composition was determined solely by the viscosity of the organopolysiloxane fluid or resin employed in the composition, in conjunction with the fillers, structuring agents, and other materials well known in the art, which are blended with these organopolysiloxane fluids or resins.

In many instances, a particular viscosity composition was employed because of the ultimate properties required, while a higher viscosity would have been desirable at the time of application. This is particularly true, for example, in certain room temperature vulcanizing elastomeric applications and in certain coating applications. In these cases, a high viscosity would be desirable at the time of application in order to provide more exact placement of the material, while a lower viscosity composition is required in the initial product.

Calcium carbonate has been employed in prior art organopolysiloxane compositions as a filler. However, the compositions employing this calcium carbonate have generally not controlled the composition in such a manner as to provide for the development of thixotropic properties.

SUMMARY OF THE INVENTION

In accordance with the present invention, it has unexpectedly been found that when controlled amounts of dry calcium carbonate within a particular size range are employed in conjunction with a dry organopolysiloxane material, the overall composition is pourable in nature. The addition, then, of small amounts of water or humectants, or a combination of the two or a combination of different humectants, results in a significant thickening, or increase in apparent viscosity, of the composition. While in general lesser quantities of water than of a particular humectant are required for a given degree of apparent thickening, the humectants can also be employed alone or a mixture of the humectants and have the added advantage of being less susceptible to removal from the composition.

The thixotropic composition is preferably formed from an organopolysiloxane fluid having the formula:

(1) $$R_n SiO_{\frac{4-n}{2}}$$

where R is a member selected from the class consisting of monovalent hydrocarbon radicals, halogenated monovalent hydrocarbon radicals, and cyanoalkyl radicals, and $n$ has a value of from about 1.95 to 2.005. The organopolysiloxane polymers can be terminated with either trimethylsilyl units or they may be provided with silanol chain terminals.

Additionally, the organopolysiloxane material employed can be resinous in nature, i.e., having significant amounts of units of the formula $RSiO_{3/2}$, where R is as previously defined. With these materials, the $n$ in Formula 1 is generally from about 1.2 to 1.8. These resinous organopolysiloxanes are generally formed by the copolymerization of the $RSiO_{3/2}$ groups previously referred to and, additionally, $R_2SiO$ and $R_3SiO_{0.5}$, where R is as previously defined, or by the cohydrolysis of materials which result in these groups.

The calcium carbonate is employed in the composition of the present invention in amounts of from about 5 to 200 parts for each 100 parts of the organopolysiloxane material. Preferably, the amount of calcium carbonate employed is in the range of from 40 to 75 parts for each 100 parts of the organopolysiloxane. Generally, lesser amounts of calcium carbonate are employed when the initial viscosity of the organopolysiloxane material used is higher. Though any calcium carbonate can be employed, the material which is employed preferably has a pH below 9 and a particle size of from 0.03 to 8.0 microns.

The apparent viscosity of the organopolysiloxane composition is then increased through the addition of small amounts of water or a humectant or mixtures thereof or mixtures of humectants or a mixture of a number of humectants and water, such as a polyfunctional compound capable of hydrogen bonding. In many instances, it is desirable that the water and the humectant be employed in combination. Preferred humectants are dihydric and polyhydric alcohols, particularly glycerol. In general, amounts of as little as 0.005 part water for each 100 parts of the organopolysiloxane composition containing calcium carbonate are effective for increasing the apparent viscosity of the composition, but larger amounts of water can be employed including amounts of up to 100 parts, and even more, such as 150 parts, for each 100 parts of the organopolysiloxane composition.

Thickening with the humectants in the absence of water is also useful and a non-sag composition, according to the Boeing Jig Test, can be formed with as little as 0.25 part glycerol for each 100 parts of the organopolysiloxane composition containing calcium carbonate. Again, larger amounts of the humectant can be employed, including amounts of up to 100 to 150 parts, or more, per 100 parts of the organopolysiloxane composition. Thus, when a mixture of humectants is used, as much as 150 parts of the mixture may be used and when a mixture of water and humectant is used, as much as 150 parts of this mixture may be used. Preferably, the amount of humectant should not exceed 150 parts for each 100 parts of the organopolysiloxane material.

Most preferably, the amount of either water, humectant, or a combination of water and humectant or a mixture of humectant alone or with water, should be in the range of from about 0.01 to 2 parts for each 100 parts of the organopolysiloxane composition containing calcium carbonate. In particular, a mixture of water and humectant in the range of from about 1 to 9 parts of humectant, or mixtures of humectants, for each part of water has been found especially desirable.

DESCRIPTION OF THE PREFERRED EMBODIMENTS

The organopolysiloxane composition of the present invention is formed from an organopolysiloxane having the formula:

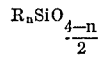

where R and $n$ are as previously defined, and from 5 to 200 parts of calcium carbonate. The organopolysiloxane fluids employed in the compositions of the present invention are known in the art and comprise a wide variety of organopolysiloxanes in which the R group of Formula 1 can represent many different radicals. Illustrative of the groups represented by R of Formula 1 are alkyl radicals, e.g., methyl, ethyl, propyl, octyl, butyl, octadecyl, etc. radicals; aryl radicals, e.g., phenyl, tolyl, xylyl, naphthyl, etc. radicals; aralkyl radicals, e.g. benzyl, phenethyl, etc. radicals; alkenyl radicals, e.g., vinyl, allyl, etc. radicals; cycloaliphatic hydrocarbon radicals, e.g., cyclohexyl, cycloheptyl, cyclohexenyl radicals; halogenated monovalent hydrocarbon radicals, e.g., chloromethyl, dibromophenyl, perfluoromethylphenyl, perfluoromethylethyl, gamma - chloropropyl, gamma - bromophenyl, gamma-iodopropyl, etc. radicals; cyanoalkyl radicals, e.g., cyanomethyl, alpha-cyanoethyl, beta-cyanomethyl, beta-cyanopropyl, gamma-cyanopropyl, omega-cyanobutyl, etc. radicals.

The viscosity of the material of Formula 1 is dependent, to some extent, upon the nature of the particular R groups in the fluid, in addition to dependency on the value of $n$, and on the length of the polymer chain. The variation in viscosity and R groups is, of course, common in the silicone fluid art and it is known that the higher the ratio of R groups to silicon atoms, the shorter will be the molecule and the lower will be the viscosity, generally. Conversely, the lower within the range described above is the number of R groups per silicon atom, the higher will be the molecular weight and the viscosity.

While the average formula of the liquid organopolysiloxane has been described as above, it should be observed that this liquid organopolysiloxane consists of various siloxane units. The predominant unit in these materials is a diorganosiloxane unit of the formula $R_2SiO$, but the organopolysiloxanes must also contain either triorganosiloxane units of the formula $R_3SiO_{0.5}$ or silanol terminals of the formula SiOH, in order to reach the proportions required by Formula 1. These organopolysiloxanes can also have triorganosiloxane and monoorganosiloxane units of the formula $RSiO_{1.5}$, in addition to diorganosiloxane units, so long as the ratios of the various units comprising the organopolysiloxane liquid are such as to provide the average composition of Formula 1. The various siloxane units, even though all are diorganosiloxane units, need not be the same. For example, the organopolysiloxane can comprise dimethylsiloxane units and methylphenylsiloxane units, or dimethylsiloxane units and diphenylsiloxane units, or methylphenylsiloxane units and methyl-beta-cyanoethylsiloxane units. The selection of the particular siloxane units is within the skill of those in the art.

While the organopolysiloxane fluid has been described with reference to being a single type of material it is very often desirable and forms one embodiment of the present invention, to use a blend of different organopolysiloxane fluids. The use of blends is desirable in those instances in which it is desirable that the shear ratio of the composition be maintained as steady as possible over a very broad temperature range, e.g., a range of from about −65° F. to 400° C. The shear ratio is the ratio of the apparent viscosity of the composition under shear to the actual viscosity. It is found that compositions having these desirable shear ratios can be obtained employing as the organopolysiloxane liquid a blend of a high viscosity organopolysiloxane and a low viscosity organopolysiloxane. The high viscosity organopolysiloxane is generally polydiorganosiloxane (which can be trimethylsilyl or silanol chain-stopped) having a viscosity in excess of about 100,000 centistokes at 25° C., where the organic groups are within the scope of the groups defined for R of Formula 1. The low viscosity material is generally a fluid having a viscosity of from about 5 to 1,000 centistokes and can comprise a conventional organopolysiloxane within the scope of Formula 1 in which the organic groups are of the same type as described with respect to the fluid of Formula 1.

The proportions of the two silicone fluids are selected so that the blend viscosity is within the desired range which, of course, will vary with the use to which the composition is to be put. The blend viscosity of a mixture of organopolysiloxanes is well known in the art and is defined by the following formula:

(2)     $\log n_B = X_1 \log n_1 + X_2 \log n_2$ where $\log n_B$ is equal to the log of the viscosity of the blend, $X_1$ is the fraction of the first silicone fluid in the blend, $\log n_1$ is the log of the viscosity of the first silicone fluid in the blend, $X_2$ is the fraction of the second silicone fluid in the blend, and $\log n_2$ is the log of the viscosity of the second silicone fluid. Employing Formula 2, the two silicone fluids are selected so as to provide the desired viscosity in the fluid blend. For many purposes, according to the present invention, a preferred fluid is a single fluid or blend of fluids having silanol chain terminals and a viscosity at 25° C. of from 2,000 to 5,000 centistokes.

The organopolysiloxane resins according to Formula 1, where $n$ is generally from about 1.2 to 1.8, are formed by the interpolymerization of polyorganosiloxanes, including polydiorganosiloxanes, polymonoorganosiloxanes and, in some cases, small amounts of polytriorganosiloxanes. Interpolymerization may, as known, be effected by cohydrolysis of materials which form the organopolysiloxane groups. The R groups are as defined for the polyorganosiloxane fluids of Formula 1 and, preferably, are methyl or phenyl. After interpolymerization, these polyorganosiloxane resins are generally bodied to a higher viscosity, but ultimate cure is not sought prior to final application, in general.

The calcium carbonate which is employed to form the subject composition can be any of a variety of commercially available particulate calcium carbonates. While it is preferred that the particle size of the calcium carbonate be from about 0.03 to 8.0 microns, this is not a critical parameter. Similarly, while a pH of somewhat less than 9 is preferred, this also is not a critical parameter. Slightly larger, or slightly more alkaline calcium carbonates can be employed. Additionally, in conjunction with the standard, particulate calcium carbonate, organic acid-treated calcium carbonates may be employed, such as those which are surface-treated with stearic acid.

The organopolysiloxane material is thoroughly mixed with the particular calcium carbonate, employing from 5 to 200 parts of calcium carbonate for each 100 parts of the organopolysiloxane material. During or after mixing, the blend is thoroughly dried employing a vacuum, such as a vacuum of about 25 millimeters of mercury for about 1 hour. When dried, the blend is completely pourable and has a viscosity determined only by the particular organopolysiloxane material and the calcium carbonate which is used. The temperature of blending and drying is not critical, though increased temperatures can be employed in the drying step in order to remove water from the composition. So long as water, or one of the previously referenced humectants alone or as a mixture, is not allowed in contact with the composition, the material will remain pourable and will maintain the previously described viscosity.

In order to thicken the material, small amounts of water, a humectant, or a blend of humectant and water or a mixture of humectants or a mixture of humectant and water, are mixed with the organopolysiloxane-calcium carbonate composition. While lesser amounts of water are effective for thickening the composition, when compared with the amounts of humectant alone required, the humectant has the advantage of a higher boiling point and, thus, less susceptibility to removal from the composition. Preferably, the material is thickened by a blend of humectant or a mixture of humectants and water, in a ratio of from about 1 to 9 parts of humectant for each part of water, and more preferably, from about 2 to 4 parts of humectant for each part of water. Though the addition of the water, humectant or blend of water and humectant significantly increases the apparent viscosity of the composition, a cure is not effected. Rather, the added material can be removed from the organopolysiloxane-calcium carbonate composition, as by evaporation or other forms of drying in the case of water, and the organopolysiloxane-calcium carbonate composition then regains its original viscosity and is again pourable.

The humectants which can be employed are those polyfunctional compounds capable of hydrogen bonding, such as polyacids, polymercaptans, polyamines, amino acids, and hydroxy acids. Preferably, the humectant is a dihydroxy or polyhydroxy alcohol. More preferably, the material is a polyhydric alcohol, such as glycerol. As mentioned, lesser quantities of water are needed for increasing the apparent viscosity of the composition than are required of a humectant for a similar increase. As little as 0.005 part of water for each 100 parts of the organopolysiloxane-calcium carbonate composition will begin to thicken the composition and significant amounts of water, beyond the 0.005 part, can be incorporated without loss of the increased apparent viscosity. For example, as much as 150 parts of water for each 100 parts of the organopolysiloxane material can be used. Employing a humectant, such as glycerol, about the same amounts will begin thickening of the composition. However, about 0.25 part of glycerol for each 100 parts of the organopolysiloxane-calcium carbonate composition is required to render the system non-sag. Additional quantities of the humectant can be included, including amounts of as much as 150 parts of glycerol for each 100 parts of the organopolysiloxane composition, and more. In general, however, there should be no more than about 150 parts of humectant or a mixture of humectants or a mixture of humectant and water for each 100 parts of the organopolysiloxane-calcium carbonate composition. Preferably, the amounts of water, humectant, or mixture of humectants or combination of water and humectant or water and mixture of humectant, should be in the range of from about 0.1 part to 2 parts for each 100 parts of the organopolysiloxane-calcium carbonate composition.

The non-sag characteristics are measured according to the Boeing Flow Jig Test and should be no more than 0.5 inch. Many of the compositions of the present invention, according to that test, have a value of 0.1 inch, and less.

In order that those skilled in the art may better understand the practice of the present invention, the following examples are given and these examples should be considered as illustrative, and not as limitative, of the present invention. All parts in the following examples are by weight.

Example 1

A quantity of 100 parts of a polydimethylsiloxane fluid having a viscosity at 25° C. of from 600 to 900 centistokes was employed. The fluid was composed of dimethylpolysiloxane units and silanol chain terminals in accordance with the structure of Formula 1. The organopolysiloxane fluid was vigorously blended with various quantities of Witcarb W calcium carbonate for 2 hours at a temperature of 125°–130° C. under a vacuum of 25 mm. mercury. The Witcarb W employed in this example, and in other examples as set forth in this application, has an average particle size of from about 0.10 to 0.35 micron and a pH of from about 8.0 to 8.5. The amounts of calcium carbonate employed, the initial viscosities, and the final results are as illustrated in Table I below:

TABLE I

| Parts calcium carbonate per 100 parts organopolysiloxane | Initial viscosity (centistokes) | Thickening characteristics |
|---|---|---|
| 10 | <13,000 | Thickened slowly on stirring in the presence of atmospheric moisture. |
| 25 | <13,000 | Thickened rapidly while stirring in the presence of atmospheric moisture. |
| 50 | <13,000 | Do. |
| 75 | <13,000 | Do. |
| 100 | <13,000 | Do. |

In each case, the thickened material was a non-flowing, grease-like material. In the absence of stirring, when the materials were not protected from moisture, they thickened slowly, from the top down, as atmospheric moisture pervaded the mixture.

Example 2

In a manner similar to that described in Example 1, a quantity of 100 parts of a silanol chain-stopped polydimethylsiloxane fluid having a viscosity of 3,000 centistokes at 25° C. was blended with 75 parts of Witcarb W. The resulting material was pourable in the absence of moisture, and had a viscosity of approximately 23,000 centistokes. On contact with moist air, the composition thickened to a "whipped cream" consistency.

Example 3

A quantity of 100 parts of a trimethylsilyl chain-stopped polydimethylsiloxane fluid having a viscosity of 2,000 centistokes at 25° C. was mixed with 50 parts of Witcarb W at a temperature of 140° C. employing an aspirator vacuum. The organopolysiloxane fluid is in accordance with Formula 1 and is formed of polydimethylsiloxy units and trimethylsiloxy units. The resultant material was pourable and had a viscosity of about 8,000 centistokes at 25° C. On contact with moist air, the material thickened to a non-flowing grease-like material.

Example 4

A quantity of 100 parts of the organopolysiloxane material employed in Example 2, 42.5 parts of Witcarb W, and 21 parts of a calcium carbonate surface coated with stearic acid was blended in the same manner as described in Example 1. The coated calcium carbonate had an average particle diameter of from about 2 to 3 microns and a pH of 7.0. The resulting compound was pourable and had a viscosity of about 20,000 centistokes at 25° C. The mixture was blended with small quantities of water and glycerol under controlled conditions. Addition of 0.005 part water resulted in a thickening of the mixture and it was rendered non-sag (less than 0.1 inch in the Boeing Flow Jig) on the addition of 0.05 part water. The non-sag characteristic was still present when as much as 100 parts of water had been added.

A separate portion of the same mixture was blended with glycerol. Extremely small quantities of glycerol resulted in a thickening of the composition and the composition was rendered non-sag upon the addition of 0.25 part glycerol. Additional glycerol was added without loss of the non-sag characteristic, including amounts of as much as 130 parts.

Example 5

A quantity of 600 parts of the silanol chain-stopped organopolysiloxane fluid employed in Example 2 was blended with 300 parts of Albacar 5970 calcium carbonate and was then dried at 115° C. for 2 hours at 15 mm. vacuum. The Albacar calcium carbonate had an average particle size of about 6 microns and a pH of from 9.03 to 10.3. After the heated vacuum treatment, the material was cooled and placed in a sealed container. Its viscosity was about 76,200 centistokes at 25° C., measured with a Brookfield viscometer. To 100 parts of the composition, a quantity of 0.06 part water was added and the material was thoroughly mixed. Almost immediately, the material thickened and showed a viscosity of 1,700,000 centistokes at 25° C.

Example 6

Employing the same ratios and the same organopolysiloxane as in the previous example, a quantity of 300 parts of Purecal U calcium carbonate was employed. This calcium carbonate has a particle size of from 0.033 to 0.040 micron and a pH of from 0.8 to 11.3. The viscosity of the mixture, in the absence of water, was approximately 30,000 centistokes. To 150 parts of this organopolysiloxane-calcium carbonate composition, a quantity of 0.06 part water was thoroughly mixed. The material thickened immediately and its viscosity at 25° C. was about 3,000,000 centistokes.

Example 7

In the same manner as in Example 5, a quantity of 600 parts of an organopolysiloxane having a viscosity of 20,000 centistokes was blended with 120 grams of Witcarb W. The organopolysiloxane fluid was one containing 90 mole percent methyl substituents on the silicon atoms and 10 mole percent phenyl substituents, with silanol chain termination. The viscosity of the mixture after processing and in the absence of water was approximately 30,000 centistokes at 25° C. and the composition was flowable. To the composition was added 0.18 part of water and there was an immediate thickening to a viscosity of about 125,000 centistokes.

Example 8

An organopolysiloxane resin was formed by the cohydrolysis of 5.2 parts of trimethylchlorosilane, 171 parts of dimethyldichlorosilane and 51 parts of methyltrichlorosilane. A quantity of 600 parts of this organopolysiloxane resin having a viscosity of 45 centistokes was blended with 300 parts of Witcarb W. The viscosity of this composition was approximately 440 centistokes at 25° C. and the composition was flowable. A quantity of 0.12 part water was added to 150 parts of the composition and there was an immediate thickening. The viscosity was measured at this point and found to be 120,000 centistokes at 25° C.

Example 9

The same mixing procedure was employed as in Example 3 employing 600 parts of a dimethylpolysiloxane fluid chain-stopped with trimethylsiloxy units and having a viscosity of 5 centistokes at 25° C. This organopolysiloxane was blended with 300 parts of Witcarb W. The viscosity was found to be 775 centistokes at 25° C. in the absence of water. To 150 parts of the organopolysiloxane-calcium carbonate composition was added 0.12 part of water. Immediate thickening occurred with an increase in viscosity at 25° C. to 300,000 centistokes.

Example 10

A quantity of 61 parts of a silanol chain-stopped dimethylpolysiloxane fluid as employed in Example 2 was blended with 26 parts of Witcarb W and 13 parts of the stearic acid-coated calcium carbonate referred to in Example 4. Mixing was carried out for 75 minutes and the composition was then found to have a viscosity at 25° C. of 19,200 centistokes. A quantity of 0.4 part of glycerol was then added to the mixture of ambient temperature, under a vacuum of 20 mm. of mercury and the resultant composition was nonflowing, showing a flow of 0.1 inch on the Boeing Flow Jig. It had a viscosity of 122,000 centistokes.

Further mixtures of the organopolysiloxane fluid, Witcarb W, and stearic acid-coated calcium carbonate, were mixed in the same manner and blended with monofunctional alcohols, such as ethanol and methanol. In each case, the composition remained flowable. Ethylene glycol and triethyleneglycol were blended with similar mixtures and the viscosity of the mixtures increased employing only small amounts of these materials. In such a composition there can be, preferably, from 25 to 50 parts of untreated calcium carbonate and from 10 to 25 parts of stearic acid-treated calcium carbonate.

Example 11

An organopolysiloxane-calcium carbonate material is prepared in the same manner, employing the same materials and in the same ratios as in Example 10. After mixing, a quantity of 0.4 part of a mixture of 3 parts of glycerol and one part of water are added to the organopolysiloxane-calcium carbonate mixture. There is an immediate increase in the viscosity of the mixture which shows a flow of less than 0.1 inch on the Boeing Flow Jig. This composition, including the glycerol-water mixture, is effective as one part of a two-part room temperature vulcanizing composition. To 100 parts of the above mixture are added 2.5 parts of a mixture of the aminoxy-substituted organosilicon materials as recited in U.S. Pat. No. 3,341,486, assigned to the same assignee as the present invention. The material is, essentially, that described in Example 1 of the aforementioned patent. The mixture, including the catalyst, retains its non-flow properties until it is finally cured into a low-modulus material. The final product has an elongation of 1300 and a tensile strength of from 100 to 150 p.s.i.

In addition to the uses set forth specifically above, the organopolysiloxane-calcium carbonate compositions containing water, a humectant, or a mixture of water and a humectant, can be blended with other materials to provide the advantages of its non-flow characteristics. For example, from about 0.1 to 0.5 percent of the organopolysiloxane-calcium carbonate composition can be blended with a mineral spirit alkyl paint or a polyester paint. It can also be used in other coating materials for a variety of purposes or, as shown in Example 3, as a grease, such as a sprayable grease.

While specific embodiments of the invention have been shown and described, the invention should not be limited to the specific methods and materials shown. It is intended, therefore, to cover all modifications within the spirit and scope of this invention by the appended claims.

We claim:

1. An organopolysiloxane composition of changeable viscosity that changes from a low viscosity mass to a high viscosity mass upon the incorporation of an additive and which is convertible to the low viscosity mass by the removal of said additive comprising:

(1) 100 parts of a fluid organopolysiloxane having the formula:

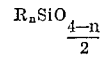

$$R_n SiO_{\frac{4-n}{2}}$$

where R is selected from the class consisting of monovalent hydrocarbon radicals, halogenated monovalent hydrocarbon radicals and cyanoalkyl radicals; and $n$ is from about 1.2 to 2.005 where the viscosity of the organopolysiloxane varies from 5 to 100,000 centistokes at 25° C.; and (2) from 5 to 200 parts of finely divided calcium carbonate, and (3) from an additive selected from the class consisting of 0.005 to 150 parts of water, 0.25 to 150 parts of polyhydroxy alcohols, and mixtures of water and polyhydroxy alcohols where there is present 1 to 9 parts of polyhydroxy alcohols per each part of water and the total parts of the water and polyhydroxy alcohols in the mixture may not exceed 150 parts.

2. The composition of claim 1 wherein the polyhydric alcohol is glycerol.

3. A thixotropic organopolysiloxane composition comprising:
(1) 100 parts of a silanol chain-terminated organopolysiloxane fluid having a viscosity of from 2,000 to 5,000 centistokes where the organo groups are selected from the group consisting of monovalent hydrocarbon radicals, halogenated monovalent hydrocarbon radicals and cyanoalkyl radicals;
(2) from 25 to 50 parts of finely divided calcium carbonate having a pH of less than 9 and a particle size of from 0.03 to 8.0 microns;
(3) from 10 to 25 parts of a finely divided calcium carbonate having a surface treatment of stearic acid; and
(4) from 0.01 to 2 parts of a mixture of glycerol and water wherein there are contained from 2 to 4 parts of glycerol for each part of water.

4. The organopolysiloxane composition of claim 1 wherein the additive is contained in an amount of 0.01 part to 2 parts.

5. The organopolysiloxane composition of claim 1 wherein said calcium carbonate is included in amounts of from 40 to 75 parts.

6. A method for increasing the viscosity of a fluid organopolysiloxane material having the formula:

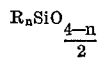

where R is selected from the class consisting of monovalent hydrocarbon radicals, halogenated monovalent hydrocarbon radicals and cyanoalkyl radicals, and $n$ is from 1.2 to 2.005 where the viscosity of the organopolysiloxane varies from 5 to 100,000 centistokes at 25° C. comprising:
(1) thoroughly blending with 100 parts of said organopolysiloxane material from 5 to 200 parts of a finely divided calcium carbonate and drying said blend; and
(2) adding to the mixture of the organopolysiloxane material and the calcium carbonate an additive selected from the class consisting of a quantity of from 0.005 to 150 parts of water, a quantity of 0.25 to 150 parts of polyhydroxy alcohols and mixtures of water and polyhydroxy alcohols where there is present 1 to 9 parts of polyhydroxy alcohols per part of water and the total parts of the water and polyhydroxy alcohols in the mixture may not exceed 150 parts.

7. The method of claim 6 wherein said additive is a mixture of water and glycerol which are added to the blend of the organopolysiloxane material and the calcium carbonate.

8. The method of claim 7 wherein the glycerol is utilized in a ratio of from 2 to 4 parts for each part of water.

References Cited
UNITED STATES PATENTS 3,098,050    7/1963    Noll et al. _____ 260—18 S
3,393,164    7/1968    Braun _____ 260—18 S LEWIS T. JACOBS, Primary Examiner U.S. Cl. X.R.

260—29.2 M, 33.4 SB